(12) United States Patent
Winningham

(10) Patent No.: US 7,423,105 B2
(45) Date of Patent: Sep. 9, 2008

(54) FAST CURING PRIMARY OPTICAL FIBER COATINGS

(75) Inventor: Michael James Winningham, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 118 days.

(21) Appl. No.: 11/240,911

(22) Filed: Sep. 30, 2005

(65) Prior Publication Data

US 2007/0078247 A1 Apr. 5, 2007

(51) Int. Cl.
*C08F 20/10* (2006.01)
*C08F 2/46* (2006.01)

(52) U.S. Cl. .............. 526/318; 526/348.1; 522/97; 522/96; 428/378; 428/383; 428/392

(58) Field of Classification Search .............. 526/317.1, 526/348.1, 318; 522/97, 96; 428/378, 383, 428/392; 523/214
See application file for complete search history.

(56) References Cited

U.S. PATENT DOCUMENTS

| | | | |
|---|---|---|---|
| 3,932,356 A | 1/1976 | Takagi | 260/75 |
| 4,076,380 A | 2/1978 | DiMarcello et al. | 350/96.31 |
| 4,176,911 A | 12/1979 | Marcatili et al. | 350/96.31 |
| 4,300,930 A | 11/1981 | Chang | 65/3.11 |
| 4,402,570 A | 9/1983 | Chang | 350/96.3 |
| 4,439,008 A | 3/1984 | Joormann et al. | 350/96.31 |
| 4,474,830 A | 10/1984 | Taylor | 427/54.1 |
| 4,486,212 A | 12/1984 | Berkey | 65/2 |
| 4,608,409 A | 8/1986 | Coady et al. | 524/199 |
| 4,609,718 A | 9/1986 | Bishop et al. | 528/49 |
| 4,629,287 A | 12/1986 | Bishop | 350/96.34 |
| 4,690,502 A | 9/1987 | Zimmerman et al. | 350/96.29 |
| 4,752,112 A | 6/1988 | Mayr | 350/96.23 |
| 4,798,852 A | 1/1989 | Zimmerman et al. | 522/96 |
| 4,851,165 A | 7/1989 | Rennell, Jr. et al. | 264/1.5 |
| 4,962,992 A | 10/1990 | Chapin et al. | 350/96.23 |
| 5,104,433 A | 4/1992 | Chapin et al. | 65/3.1 |
| 5,486,378 A | 1/1996 | Oestreich et al. | 427/163.2 |
| 5,729,645 A | 3/1998 | Garito et al. | 385/127 |
| 6,136,880 A | 10/2000 | Snowwhite et al. | 522/64 |
| 6,187,835 B1 | 2/2001 | Szum et al. | 522/96 |
| 6,191,187 B1 * | 2/2001 | Yamamura et al. | 522/96 |
| 6,316,516 B1 | 11/2001 | Chien et al. | 522/91 |
| 6,359,025 B1 | 3/2002 | Snowwhite et al. | 522/64 |
| 6,376,571 B1 | 4/2002 | Chawla et al. | 522/64 |
| 6,531,522 B1 * | 3/2003 | Winningham | 522/96 |
| 6,916,855 B2 | 7/2005 | Jansen et al. | 522/167 |
| 2001/0025062 A1 | 9/2001 | Szum et al. | 522/96 |
| 2005/0129859 A1 | 6/2005 | Misev et al. | 427/384 |

FOREIGN PATENT DOCUMENTS

GB 2 257 153 * 1/1993

OTHER PUBLICATIONS

*Handbook of Pressure Sensitive Adhesive Technology*, 3rd Ed., Rhode Island, Satas, pp. 36, 37, 57-61, 169, 173, and 174 (1999).
J.E. Midwinter, *Optical Fibers for Transmission*, New York, John Wiley, pp. 166-178 (1979).
Blankenship et al, "The Outside Vapor Deposition Method of Fabricating Optical Waveguide Fibers", IEEE J Quantum Electronics, vol. QE-18, No. 10, Oct. 1982, pp. 1418-1423.
*Viscolastic Properties of Polymers*, 3rd Ed., New York, John Wiley, Chapter 1 (pp. 1-32) (1980).
S.R. Nagel et al. "An overview of the Modified Chemical Vapor Deposition (MCVD) Process and Performance", IEEE J Quantum Electronics, vol. QE-18, No. 4, Apr. 1982, pp. 459-476.
K. Inada, "Recent Progress in Fiber Fabrication Techniques by Vapor-Phase Axial Depostion", IEEE J Quantum Electronics, vol. QE-18, No. 10, Oct. 1982, pp. 1424-1431.

* cited by examiner

*Primary Examiner*—Ling-Siu Choi
(74) *Attorney, Agent, or Firm*—Robert L. Carlson

(57) ABSTRACT

A curable composition for coating an optical fiber that includes an aliphatic-aromatic oxyglycidyl(meth)acrylate monomeric component, an aliphatic-(hetero)cyclic oxyglycidyl(meth)acrylate monomeric component, or a combination thereof, and an ethylenically unsaturated urethane or urea oligomeric component. Cured products of the composition and optical fibers that contain cured primary coatings formed from such compositions are also disclosed. The resulting optical fibers and optical fiber ribbons containing them can be used for data transmission in telecommunications systems.

21 Claims, 1 Drawing Sheet

FAST CURING PRIMARY OPTICAL FIBER COATINGS

FIELD OF THE INVENTION

The present invention relates generally to optical fibers and particularly to coatings applied to the fibers.

BACKGROUND OF THE INVENTION

Optical fibers have acquired an increasingly important role in the field of communications, frequently replacing existing copper wires. This trend has had a significant impact in the local area networks (i.e., for fiber-to-home uses), which has seen a vast increase in the usage of optical fibers. Further increases in the use of optical fibers in local loop telephone and cable TV service are expected, as local fiber networks are established to deliver ever greater volumes of information in the form of data, audio, and video signals to residential and commercial users. In addition, use of optical fibers in home and commercial business for internal data, voice, and video communications has begun and is expected to increase.

The fibers used in local networks are directly exposed to harsh conditions, including severe temperature and humidity extremes. Prior coatings for optical fibers did not perform well under such adverse conditions. The need existed for the development of higher performance coatings to address the wide and varied temperature and humidity conditions in which fibers are employed. Specifically, these coatings possessed thermal, oxidative, and hydrolytic stability which is sufficient to protect the encapsulated fiber over a long lifespan (i.e., about twenty-five or more years).

Optical fibers typically contain a glass core, a cladding, and at least two coatings, i.e., a primary (or inner) coating and a secondary (or outer) coating. The primary coating is applied directly to the cladding and, when cured, forms a soft, elastic, and compliant material that encapsulates the glass fiber. The primary coating serves as a buffer to cushion and protect the glass fiber core when the fiber is bent, cabled, or spooled. Stresses placed upon the optical fiber during handling may induce microbending of the fibers, which can cause attenuation of the light that is intended to pass through them, resulting in inefficient signal transmission. The secondary coating is applied over the primary coating and functions as a tough, protective outer layer that prevents damage to the glass fiber during processing and use.

Certain characteristics are desirable for the primary coating, and others for the secondary coating. The modulus of the primary coating must be sufficiently low to cushion and protect the fiber by readily relieving stresses on the fiber. This cushioning effect must be maintained throughout the fiber's lifetime.

Because of differential thermal expansion properties between the primary and secondary coatings, the primary coating must also have a glass transition temperature ($T_g$) that is lower than the foreseeable lowest use temperature. This enables the primary coating to remain elastic throughout the temperature range of use, facilitating differences in the coefficient of thermal expansion between the glass fiber and the secondary coating.

It is also important for the primary coating to have a refractive index that is different (i.e., higher) than the refractive index of the cladding. This permits a refractive index differential between the cladding and the primary coating that allows errant light signals to be refracted away from the glass core.

The cost to produce coated optical fibers with the above properties is largely dependent on the draw tower line speed and draw utilization. A limiting factor in the operation of a draw tower line speed is the rate of cure of the primary and secondary coatings applied to the fibers. Under cured coatings can yield unwanted fiber defects, which may lead to functional problems with the resultant coated fiber. Previous methods to improve the rate of cure or rate of polymerization include the use of wholly acrylated coating systems, the use of highly efficient photoinitiating systems, and increases in UV radiation. Photoinitiated polymerization reactions generally follow the relationship:

$$R_p = k_p[M](\Phi \epsilon I_o[A]b/k_t)^{1/2}$$

where $R_p$: rate of polymerization; $k_p$: propagation rate constant; [M]: concentration of reactive functional group; $\Phi$: quantum yield for initiation; $\epsilon$: molar absorptivity; $I_o$: incident light intensity; [A]: concentration of photoinitiator; b: thickness of reaction system (coating thickness); and $k_t$: termination rate constant.

Formulation efforts to maximize the rate of polymerization include the use of reactive monomers, oligomers, and mixtures thereof with high propagation rate constants, the use photoinitiators with high photoinitiating efficiencies, and selecting components that would not increase the tendency toward chain termination or chain transfer. Chain transfer agents may not decrease the rate of polymerization, but will reduce the degree of polymerization.

Two prior approaches for improving the rate of cure involve the use of aliphatic glycidyl(meth)acrylate monomers or aromatic glycidyl(meth)acrylate monomers. Unfortunately, aliphatic glycidyl(meth)acrylate monomers are characterized by low refractive indices, resulting in primary coatings with refractive indices that are lower than desired. Aromatic glycidyl(meth)acrylate monomers, such as phenoxy glycidyl acrylate, have the disadvantage of imparting a high $T_g$ to cured compositions comprising these monomers. This renders the cured compositions unsuitable for use as a primary coating composition in most applications.

Thus, a need still exists to identify other monomers that can improve the rate of cure, while achieving a primary coating composition that possesses a desirable refractive index and a desirable $T_g$.

The present invention is directed to overcoming these and other deficiencies in the art.

SUMMARY OF THE INVENTION

A first aspect of the invention relates to a curable composition for coating an optical fiber. The curable composition includes an aliphatic-aromatic oxyglycidyl(meth)acrylate monomeric component, an aliphatic-(hetero)cyclic oxyglycidyl(meth)acrylate monomeric component, or a combination thereof; and an ethylenically unsaturated urethane or urea oligomeric component.

According to a preferred embodiment, the oxyglycidyl (meth)acrylate monomeric components have the structure according to formula (I)

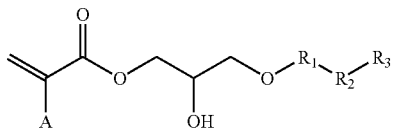

(I)

wherein A is H or $CH_3$;

$R_1$ is optional, in which case $R_2$ can be bonded directly to the oxyglycidyl structure, and $R_1$ can be an aliphatic hydrocarbon from about 1 to about 25 carbons in length, including straight and branched chain hydrocarbons, saturated or unsaturated, and those hydrocarbons containing one or more hetero atoms selected from the group of nitrogen, oxygen, halogens, silicon, sulfur, phosphorus, and mixtures thereof;

$R_2$ is an aromatic moiety having a single ring, multiple ring, or fused ring structure, and optionally containing one or more heteroatoms selected from the group of nitrogen, oxygen, sulfur, phosphorus, halogens and mixtures thereof, or a non-aromatic (hetero)cyclic moiety optionally containing one or more heteroatoms selected from the group of nitrogen, oxygen, sulfur, phosphorous, halogens, and mixtures thereof; and $R_3$ is an aliphatic hydrocarbon from about 1 to about 25 carbons in length, including straight and branched chain hydrocarbons, saturated or unsaturated, and those hydrocarbons containing one or more hetero atoms selected from the group of nitrogen, oxygen, halogens, silicon, sulfur, phosphorus, and mixtures thereof.

A second aspect of the invention relates to a coating product formed upon curing of the curable composition (according to the first aspect of the present invention) following exposure to actinic radiation.

A third aspect of the invention relates to an optical fiber that includes: a glass fiber, and a primary coating encapsulating and in contact with the glass fiber, where the primary coating is the cured product of a curable composition according to the first aspect of the present invention.

A fourth aspect of the invention relates to an optical fiber ribbon that includes a plurality of the optical fibers (according to the third aspect of the present invention) and a matrix material encapsulating the plurality of optical fibers.

A fifth aspect of the invention relates to a telecommunication system that contains one or more optical fibers or fiber optic ribbons (according to the third and fourth aspects of the invention, respectively).

A sixth aspect of the invention relates to a method of making an optical fiber that includes the steps of: coating a glass fiber with a curable primary composition (according to the first aspect of the invention), and polymerizing the composition to form a primary coating.

The coating composition of the invention has the advantage of having an excellent polymerization rate, while the cured coating possesses a sufficiently low glass transition temperature ($T_g$) and a sufficiently high refractive index. Coating an optical fiber with the coating of the invention has the advantage of increasing the draw speed and increasing the rate of production of the resultant optical fiber. The resulting optical fibers are suitable for use in most telecommunication systems.

Additional features and advantages of the invention will be set forth in the detailed description which follows, and in part will be readily apparent to those skilled in the art from that description or recognized by practicing the invention as described herein, including the detailed description which follows, the claims, as well as the appended drawing.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 2:
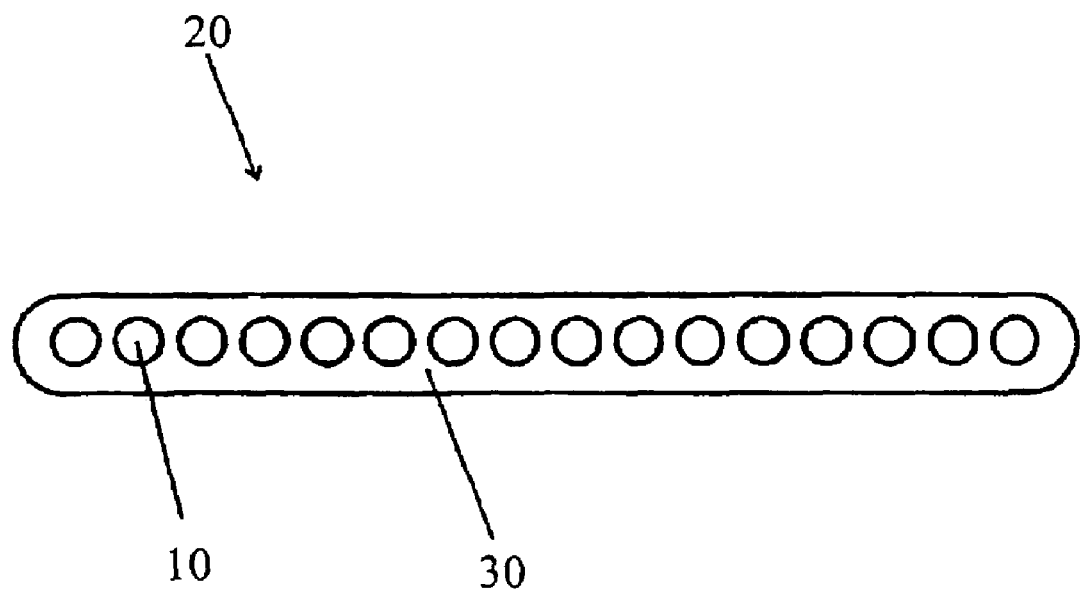
FIG. 2 is a cross-sectional view of an optical fiber ribbon made in accordance with the present invention.

Reference will now be made in detail to the present preferred embodiments of the invention, an example of which is illustrated in the accompanying drawings. Wherever possible, the same reference numbers will be used throughout the drawing to refer to the same or like parts. An exemplary embodiment of the present invention is shown in FIG. 1, and is designated generally throughout by reference numeral 10.

The invention relates to an optical fiber that includes a glass fiber and a primary coating encapsulating and in contact with the glass fiber. This primary coating is the cured or substantially cured product of a polymerizable composition that includes a monomer with an aliphatic-aromatic oxyglycidyl (meth)acrylate component, an aliphatic-(hetero)cyclic oxyglycidyl(meth)acrylate component, or a combination thereof. The monomer is present in an amount effective to enhance the rate of cure of the primary coating (a.k.a., polymerization rate or cure speed). Recently it has been discovered that, in accordance with one embodiment of the invention, including an aliphatic-aromatic oxyglycidyl(meth)acrylate component in the monomer will increase the polymerization rate of the coating, while affording a cured product that is characterized by a sufficiently low $T_g$ and a sufficiently high refractive index (both of which allow for its use as a primary optical fiber coating).

Figure 1:
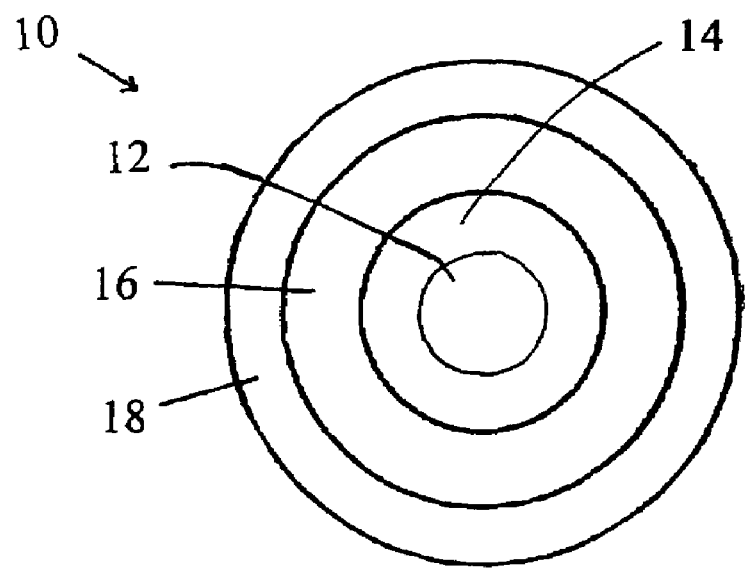
FIG. 1 is a cross-sectional view of an optical fiber made in accordance with the present invention.

Referring to FIG. 1, the optical fiber 10 includes a glass core 12, a cladding layer 14 surrounding and adjacent to the glass core 12, a primary coating material 16 that adheres to the cladding layer 14, and one or more secondary (or outer) coating materials 18 surrounding and adjacent to the primary coating material 16.

The primary coating material 16 is the cured product of a composition that contains a monomeric component and an oligomeric component.

In accordance with the invention, the monomeric component includes one or more monomers, at least one of which is an aliphatic-aromatic oxyglycidyl(meth)acrylate, an aliphatic-(hetero)cyclic oxyglycidyl(meth)acrylate, or a combination thereof. Preferably these oxyglycidyl(meth)acrylate monomer components have the structure according to formula (I) as follows:

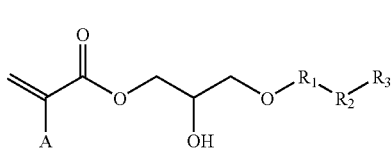

(I)

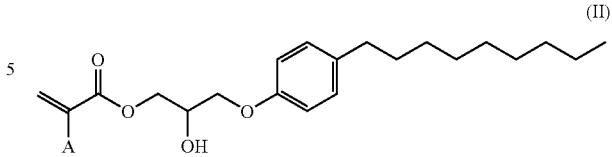

(II)

wherein A is H or $CH_3$;

$R_1$ is optional, in which case $R_2$ is bonded directly to the oxyglycidyl structure, and $R_1$ can be an aliphatic hydrocarbon from about 1 to about 25 carbons in length, including straight and branched chain hydrocarbons, saturated or unsaturated (including polyunsaturated), and those hydrocarbons containing one or more hetero atoms selected from the group of nitrogen, oxygen, halogens, silicon, sulfur, phosphorus, and mixtures thereof;

$R_2$ is an aromatic moiety having a single ring, multiple ring, or fused ring structure, and optionally containing one or more heteroatoms selected from the group of nitrogen, oxygen, sulfur, phosphorus, halogens and mixtures thereof, or a non-aromatic (hetero)cyclic moiety optionally containing one or more heteroatoms selected from the group of nitrogen, oxygen, sulfur, phosphorous, halogens, and mixtures thereof; and $R_3$ is an aliphatic hydrocarbon from about 1 to about 25 carbons in length, including straight and branched chain hydrocarbons, saturated or unsaturated (including polyunsaturated), and those hydrocarbons containing one or more hetero atoms selected from the group of nitrogen, oxygen, halogens, silicon, sulfur, phosphorus, and mixtures thereof.

According to one embodiment, the $R_1$ group is not present, in which case the —$R_2$—$R_3$ substituent is bonded directly to the oxyglycidyl structure.

According to another embodiment, $R_1$ is present. Preferred $R_1$ groups include, without limitation, $C_{2-20}$ aliphatic hydrocarbons and $(CH_2)_n$—$(X$—$(CH_2)_n)_m$ where each n is independently from 2 to 5, m is from 1 to 10, and X is O or S. Most preferred $R_1$ groups, when present, include those containing at least one and up to eleven repeating ethylene oxide groups, propylene oxide groups, or combinations thereof.

Exemplary $R_2$ groups include, without limitation, (hetero) aromatic hydrocarbons and non-aromatic (hetero)cyclic moieties selected from the group of substituted and unsubstituted phenyls, biphenyls, napthyls, anthracenyls, cyclic alkenes and dienes; N-hetero groups (e.g., pyrrolyl, indolyl, isoindolyl, imidazolyl, benzimidazolyl, purinyl, pyrazolyl, indazolyl, pyridinyl, quinolinyl, isoquinolinyl, pyrazinyl, quinoxalenyl, pyrimidinyl, cinnolinyl, quinazolinyl, pyrrolidinyl), S-hetero groups (e.g., thiophenyl, benzthiophenyl), O-hetero groups (e.g., furanyl, benzofuranyl, isobenzofuranyl), and mixed hetero aromatics (e.g., thiazolyl, benzthiazolyl, oxazolyl, benzoxazolyl, isooxazolyl, benisooxazolyl). Preferred $R_2$ groups include bisphenol A and derivatives thereof, and bisphenol F and derivatives thereof.

Preferred $R_3$ groups include, without limitation, $C_{5-15}$ aliphatic hydrocarbons as described above, more preferably $C_{6-12}$ hydrocarbons.

Preferred compounds according to formula (I) are nonylphenolglycidyl(meth)acrylates according to formula (II) below:

The monomeric component is preferably present in the composition in an amount of about 5 to about 95 percent by weight, more preferably about 5 to about 60 percent by weight, most preferably, about 20 to about 50 percent by weight. The aliphatic-aromatic oxyglycidyl(meth)acrylate monomer of the present invention can be the exclusive monomeric component (in which case the above-noted amounts apply exclusively to this monomer), or it can be a portion of the monomer component (i.e., a co-monomer is present).

As used herein, the weight percent of a particular component refers to the amount introduced into the bulk composition excluding an adhesion promoter and other additives. The amount of adhesion promoter and various other additives that are introduced into the bulk composition to produce a composition of the present invention is listed in parts per hundred. For example, a monomer with an aliphatic-aromatic oxyglycidyl acrylate, an oligomer, and photoinitiator are combined to form the bulk composition such that the total weight percent of these components equals 100 percent. To this bulk composition, an amount of adhesion promoter, for example 1.0 part per hundred, is introduced in excess of the 100 weight percent of the bulk composition.

As noted above, the primary coating composition of the present invention also includes an oligomeric component, which can be one or more oligomers. Preferably the oligomeric component includes ethylenically unsaturated urethane or urea oligomer(s), more preferably an aliphatic polyether urethane acrylate.

Urethane oligomers are conventionally provided by reacting an aliphatic or aromatic diisocyanate with a dihydric polyether or polyester, most typically a polyoxyalkylene glycol such as a polyethylene glycol. Such oligomers typically have 4-10 urethane groups and may be of high molecular weight, e.g., 2000-8000. However, lower molecular weight oligomers, having molecular weights in the 500-2000 range, may also be used. U.S. Pat. No. 4,608,409 to Coady et al. and U.S. Pat. No. 4,609,718 to Bishop et al., each of which is hereby incorporated by reference in its entirety, describe such syntheses in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from 2-250 carbon atoms and, preferably, are substantially free of ether or ester groups. The ranges of oligomer viscosity and molecular weight obtainable in these systems are similar to those obtainable in unsaturated, polar oligomer systems, such that the viscosity and coating characteristics thereof can be kept substantially unchanged. The reduced oxygen content of these coatings has been found not to unacceptably degrade the adherence characteristics of the coatings to the surfaces of the glass fibers being coated.

As is well known, polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently non-polar and saturated as to avoid compromising the moisture resistance of the system.

Thus, it is desirable for the coating composition of the present invention to contain at least one ethylenically unsaturated oligomer, although more than one oligomer component can be introduced into the composition. Preferably, the oligomer(s) is present in the coating composition in an amount between about 10 to about 90 percent by weight, more preferably between about 30 to about 90 percent by weight, and most preferably between about 35 to about 60 percent by weight.

Examples of suitable ethylenically unsaturated oligomers are polyether urethane acrylate oligomers (e.g., CN986 available from Sartomer Company, Inc., (West Chester, Pa.), BR3741, BR3731 and STC3-149 available from Bomar Specialties Co. (Winsted, Conn.), Photomer 6008 available from Cognis Corporation (Ambler, Pa.), and Purelast566A available from Polymer Systems Corporation, (Orlando, Fla.)), polyester urethane acrylate oligomers (e.g., CN966 and CN973 available from Sartomer Company, Inc., Photomer 6140 oligomer/monomer blend available from Cognis Corporation (Ambler, Pa.), and BR7432 available from Bomar Specialty Co.), polyurea urethane acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,629,287 to Bishop et al., each of which is hereby incorporated by reference in its entirety), polyether acrylate oligomers (e.g., Genomer 3456 available from Rahn AG (Zurich, Switzerland)), polyester acrylate oligomers (e.g., Ebecryl 80, 584, and 657 available from UCB Radcure (Atlanta, Ga.)), polyurea acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,629,287 to Bishop et al., each of which is hereby incorporated by reference in its entirety), epoxy acrylate oligomers (e.g., CN120 available from Sartomer Company, Inc., and Ebecryl 3201 and 3204 available from UCB Radcure), hydrogenated polybutadiene oligomers (e.g., Echo Resin MBNX available from Echo Resins and Laboratory (Versailles, Mo.)), and combinations thereof.

The primary coating compositions of the invention may also optionally include, in addition to the monomeric component(s) and the oligomeric component identified above, a co-monomer component. Preferably, the co-monomer is an ethylenically unsaturated monomer, more preferably a (meth) acrylate monomer. Generally, suitable monomers are those for which the resulting homopolymer or mixtures of monomers would have a glass transition temperature ($T_g$) of at most about 0° C., preferably at most about −10° C. Generally, a lower molecular weight (i.e., about 120 to 600) liquid (meth) acrylate-functional monomer is added to the formulation to provide the liquidity needed to apply the coating composition with conventional liquid coating equipment. Typical acrylate-functional liquids in these systems include monofunctional and polyfunctional acrylates (i.e., monomers having two or more acrylate functional groups). Illustrative of these polyfunctional acrylates are the difunctional acrylates, which have two functional groups; the trifunctional acrylates, which have three functional groups; and the tetrafunctional acrylates, which have four functional groups. Monofunctional and polyfunctional (meth)acrylates may also be employed.

When it is desirable to utilize moisture-resistant components, the co-monomer component will be selected on the basis of its compatibility with the selected moisture-resistant oligomer. Not all such liquid monomers may be successfully blended and co-polymerized with the moisture-resistant oligomers, because such oligomers are highly non-polar. For satisfactory coating compatibility and moisture resistance, it is desirable to use a liquid acrylate monomer component comprising a predominantly saturated aliphatic mono- or di-acrylate monomer or alkoxy acrylate monomers.

Thus, it is desirable for the composition to contain at least one ethylenically unsaturated co-monomer, although more than one co-monomer can be introduced into the composition. Preferably, the ethylenically unsaturated co-monomer is present in the composition in an amount up to about 85 percent by weight. In this embodiment of the invention, the coating includes at least about 5 weight percent of the oxyglycidyl (meth)acrylate monomeric component, more preferably about 10 to about 70 weight percent of this monomeric component.

Suitable ethylenically unsaturated co-monomers include lauryl acrylate (e.g., SR335 available from Sartomer Company, Inc., Ageflex FA12 available from Ciba Specialty Chemicals (Tarrytown, N.Y.), and Photomer 4812 available from Cognis Corporation (Ambler, Pa.)), ethoxylated-nonylphenol acrylate (e.g., SR504 available from Sartomer Company, Inc. and Photomer 4003 available from Cognis Corporation), phenoxyethyl acrylate (e.g., SR339 available from Sartomer Company, Inc., Ageflex PEA available from Ciba Specialty Chemicals, and Photomer 4035 available from Cognis Corporation), isooctyl acrylate (e.g., SR440 available from Sartomer Company, Inc. and Ageflex FA8 available from Ciba Specialty Chemicals), tridecyl acrylate (e.g., SR489 available from Sartomer Company, Inc.), isobornyl acrylate (e.g., SR506 available from Sartomer Company, Inc. and Ageflex IBOA available from Ciba Specialty Chemicals), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and Ageflex FA10 available from Ciba Specialty Chemicals), 2-(2-ethoxyethoxy)ethyl acrylate (e.g., SR256 available from Sartomer Company, Inc.), and combinations thereof.

In addition to (meth)acrylate co-monomers, ethylenically unsaturated co-monomers that are not based on (meth)acrylates may also be employed. Such monomers include vinyl ethers, maleimides, vinyl amides, vinyl esters, crotonate esters, styrene based monomers, acrylamides, and vinyl amides. Vinyl amide co-monomers are particularly preferred co-monomers. Suitable vinyl amide co-monomers include N-vinylpyrrolidinone (Sigma-Aldrich (St. Louis, Mo.), and International Specialty Products (Waterford, Mich.)) and N-vinylcaprolactam (Aldrich Chemical Company and International Specialty Products).

As is well known, optical fiber coating compositions may also contain a polymerization initiator that is suitable to cause polymerization (i.e., curing) of the composition after its application to a glass fiber. Polymerization initiators suitable for use in the primary coating compositions of the present invention include thermal initiators, chemical initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes between about 0.5 to about 10.0 percent by weight, more preferably between about 1.5 to about 7.5 percent by weight.

The photoinitiator, when used in a small but effective amount to promote radiation cure, must provide reasonable cure speed without causing premature gelation of the coating composition. A desirable cure speed is any speed sufficient to cause substantial curing of the coating materials. As measured in a dose versus modulus curve, a cure speed for coating thicknesses of about 25-35 μm is, e.g., less than 1.0 J/cm², preferably less than 0.5 J/cm², which is typically sufficient as a maximum dose to reach maximal Young's modulus for the coating.

Suitable photoinitiators include bis acyl phosphine oxides in a blend or a pure form (e.g. Irgacure 1850, Irgacure 1800, Irgacure 1700 or Irgacure 819 available from Ciba Specialty Chemicals, Tarrytown, N.Y.), mono acyl phosphine oxides in a blend or pure form (e.g. Lucerin TPO available from BASF or Darocur 4265 available from Ciba Specialty Chemicals), 1-hydroxycyclohexylphenyl ketone (e.g., Irgacure 184 available from Ciba Specialty Chemicals (Tarrytown, N.Y.), 2-hydroxy-2-methyl-1-phenylpropan-1-one (e.g. Darocur 1173 from Ciba Specialty Chemicals), 4-(2-hydroxyethoxy)phenyl-(2-hydroxy-2-methylpropyl)ketone (e.g. Irgacure 2959 available from Ciba Specialty Chemicals), 2-methyl-1-[4-(methylthio)phenyl]-2-morpholino propan-1-one (e.g. Irgacure 907 available from Ciba Specialty Chemicals), 2-benzyl-2-N,N-dimethylamino-1-(4-morpholinophenyl)-1-butanone (e.g. Irgacure 369 available from Ciba Specialty Chemicals), 2,2-dimethoxy-2-phenyl acetophenone (e.g., Irgacure 651, available from Ciba Specialty Chemicals), and combinations thereof.

Preferably, an adhesion promoter is present in the coating composition. In a preferred embodiment, the adhesion promoter is present in the composition in an amount between about 0.1 to about 10 parts per hundred, more preferably between about 0.25 to about 4 parts per hundred, most preferably between about 0.5 to about 3 parts per hundred. Examples of a suitable adhesion promoter include organofunctional silane, titanate, zirconate, and mixtures thereof. A preferred adhesion promoter is a bis silane. Suitable alternative adhesion promoters include 3-mercaptopropyltrimethoxysilane (3-MPTMS, available from United Chemical Technologies (Bristol, Pa.) and available from Gelest (Morrisville, Pa.)), 3-acryloxypropyltrimethoxysilane (available from Gelest (Morrisville, Pa.)), and 3-methacryloxypropyltrimethoxysilane (available from Gelest (Morrisville, Pa.)), and bis(trimethoxysilylethyl)benzene (available from Gelest (Morrisville, Pa.)); see U.S. Pat. No. 6,316,516 to Chien et al, which is hereby incorporated by reference in its entirety).

A carrier additive may also be used with the adhesion promoter. The carrier is preferably a carrier which functions as a carrier surfactant, ambiphilic reactive or non-reactive surfactant. Reactive surfactants which are partially soluble or insoluble in the composition are particularly preferred. Without being bound to a particular theory, it is believed that carriers that function as reactive surfactants interact with the compound containing a reactive silane by depositing such compounds on the glass fiber, where it is allowed to react. It is desirable for the carrier to be present in an amount between about 0.01 to about 5 parts per hundred, more preferably about 0.25 to about 3 parts per hundred.

Suitable carriers, more specifically carriers which function as reactive surfactants, include polyalkoxypolysiloxanes. A preferred carrier is available from Goldschmidt Chemical Co. (Hopewell, Va.) under the tradename Tegorad 2200 or Tegorad 2700 (acrylated siloxane).

Other classes of suitable carriers are polyols and non-reactive surfactants. Examples of suitable polyols and non-reactive surfactants include polyol Acclaim 3201 (poly(ethylene oxide-co-propylene oxide)) available from Bayer (Pittsburgh, Pa.) and non-reactive surfactant Tegoglide 435 (polyalkoxy-polysiloxane) available from Goldschmidt Chemical Co. The polyol or non-reactive surfactant may be present in a preferred amount between about 0.01 pph to about 10 pph.

Suitable carriers may also be ambiphilic molecules. An ambiphilic molecule is a molecule that has both hydrophilic and hydrophobic segments. The hydrophobic segment may alternatively be described as a lipophilic (fat/oil loving) segment. A common example of an ambiphilic molecule is soap.

A tackifier modifies the time-sensitive rheological property of a polymer product. In general, a tackifier will make a polymer product act stiffer at higher strain rates or shear rates and will make the polymer product softer at low strain rates or shear rates. A tackifier is commonly used in the adhesives industry and enhances the ability of a coating to create a bond with an object that the coating is applied upon. For additional background regarding tackifiers, the *Handbook of Pressure Sensitive Adhesive Technology*, $3^{rd}$ Ed., pp 36, 37, 57-61, 169, 173, and 174, is incorporated herein by reference in its entirety.

One particularly suitable tackifier is Uni-tac® R-40 (hereinafter "R-40") available from International Paper Co., Purchase, N.Y. R-40 is a tall oil rosin and is from the chemical family of abietic esters. R-40 contains a polyether segment. Preferably, the tackifier is present in the composition in an amount between about 0.01 to about 10 parts per hundred, more preferred in the amount between about 0.05 to about 10 parts per hundred.

Preferably the adhesion promoter used in combination with the tackifier carrier is a poly(alkoxy)silane. However, the invention is not limited to only a poly(alkoxy)silane adhesion promoter in combination with a tackifier carrier. A preferred poly(alkoxy)silane adhesion promoter is bis(trimethoxysilylethyl)benzene. It is also preferred that the poly(alkoxy)silane adhesion promoter is present in the composition in an amount between 0.1 to 10 pph.

In addition to the above-described components, the primary coating composition of the present invention can optionally include any number of additives, such as reactive diluents, antioxidants, catalysts, and other stabilizers and property-enhancing additives. Some additives can operate to control the polymerization process, thereby affecting the physical properties (e.g., modulus, glass transition temperature) of the polymerization product formed from the primary coating composition. Others can affect the integrity of the polymerization product of the primary coating composition (e.g., protect against de-polymerization or oxidative degradation).

A preferred catalyst is a tin-catalyst, which is used to catalyze the formation of urethane bonds in some oligomer components. Whether the catalyst remains as an additive of the oligomer component or additional quantities of the catalyst are introduced into the composition of the present invention, the presence of the catalyst can act to stabilize the oligomer component in the composition.

A preferred antioxidant is bis hindered phenolic sulfide or thiodiethylene bis(3,5-di-tert-butyl)-4-hydroxyhydrocinnamate (e.g., Irganox 1035, available from Ciba Specialty Chemical).

A preferred stabilizer is a tetrafunctional thiol (e.g., pentaerythritol tetrakis(3-mercaptopropionate) from Sigma-Aldrich (St. Louis, Mo.).

The curable primary compositions of the present invention are intended to be cured (i.e., polymerized) following exposure to, e.g., actinic radiation. The cured products are characterized by one or more of the following properties: (i) a liquid coating refractive index of at least about 1.46, more preferably at least about 1.47, most preferably at least about 1.48; (ii) a glass transition temperature ($T_g$) of not more than about 0° C., more preferably not more than about −5 or −10° C., most preferably not more than about −15 or −20° C.; (iii) a cure rate of at least about 120, 125, or 130 percent/s, more preferably at least about 135, 140, or 145 percent/s, most preferably at least about 150 percent/s; and (iv) a Young's Modulus of not more than about 1.5, 1.4, or 1.3 MPa, more preferably not more than about 1.2 or 1.1 MPa, most preferably not more than about 1.0 or 0.95 MPa. In preferred embodiments, the cured primary coatings satisfy two or more of the above-recited properties, more preferably three or more of the above-recited properties, or most preferably all four of the above-recited properties.

A further aspect of the present invention relates to an optical fiber of the type described above, where the primary coating is the cured product of a composition of the present invention. Referring again to FIG. 1, the optical fiber 10 includes a glass core 12, a cladding layer 14 surrounding and adjacent to the glass core 12, a primary coating material 16 which adheres to the cladding layer 14, and one or more secondary (or outer) coating materials 18 surrounding and adjacent to the primary coating material 16.

Any conventional material can be used to form the glass core 12, such as those described in U.S. Pat. No. 4,486,212 to Berkey, which is hereby incorporated by reference in its entirety. The core is typically a silica glass having a cylindrical cross section and a diameter ranging from about 5 to about 10 μm for single-mode fibers and about 20 to about 100 μm for multi-mode fibers. The core can optionally contain varying amounts of other material such as, e.g., oxides of titanium, thallium, germanium, and boron, which modify the core's refractive index. Other dopants which are known in the art can also be added to the glass core to modify its properties.

The cladding layer 14 preferably has a refractive index that is less than the refractive index of the core. A variety of cladding materials, both plastic and glass (e.g., silicate and borosilicate glasses) are used in constructing conventional glass fibers. Any conventional cladding materials known in the art can be used to form the cladding layer 14 in the optical fiber of the present invention.

The glass core 12 and cladding layer 14, which together form the glass fiber, can be formed according to a number of processes known in the art. In many applications, the glass core 12 and cladding layer 14 have a discernable core-cladding boundary. Alternatively, the core and cladding layer can lack a distinct boundary. One such glass fiber is a step-index fiber, which is formed basically by applying the cladding layer 14 as a series of glass or plastic layers of varying refractive index. Exemplary step-index fibers are described in U.S. Pat. Nos. 4,300,930 and 4,402,570 to Chang, each of which is hereby incorporated by reference in its entirety. Another such fiber is a graded-index fiber, which has a core whose refractive index varies with distance from the fiber. A graded-index fiber is formed basically by diffusing the glass core 12 and cladding layer 14 into one another. Exemplary graded-index fibers are described in U.S. Pat. No. 5,729,645 to Garito et al., U.S. Pat. No. 4,439,008 to Joormann et al., U.S. Pat. No. 4,176,911 to Marcatili et al., and U.S. Pat. No. 4,076,380 to DiMarcello et al., each of which is hereby incorporated by reference in its entirety. The optical fibers of the present invention can contain these or any other conventional core-cladding layer configuration now known or hereafter developed.

The secondary coating material(s) 18 is typically the polymerization (i.e., cured) product of a coating composition that contains urethane acrylate liquids whose molecules become cross-linked when polymerized. Other suitable materials for use in secondary coating materials, as well as considerations related to selection of these materials, are well known in the art and are described in U.S. Pat. Nos. 4,962,992 and 5,104,433 to Chapin, each of which is hereby incorporated by reference in its entirety. Various additives that enhance one or more properties of the coating can also be present, including the above-mentioned additives incorporated in the compositions of the present invention.

The secondary coating materials 18 can be a tight buffer coating or, alternatively, a loose tube coating. Irrespective of the type of secondary coating employed, it is preferred that the outer surface of the secondary coating material 18 not be tacky so that adjacent convolutions of the optic fiber (i.e., on a process spool) can be unwound.

Preferred secondary coatings are those that possess a Young's modulus of at least about 1200 MPa, a $T_g$ of at least about 60° C., and a fracture toughness of at least about 0.7 MPa/cm$^2$.

The optical fiber of the present invention can optionally include a coloring material, such as a pigment or dye, or an additional colored ink coating. The ink coating is typically applied over the secondary coating and then cured.

Another aspect of the present invention relates to a method of making an optical fiber of the present invention. Basically, this method can be effected by standard methods with the use of a primary coating composition of the present invention.

Briefly, the process involves providing the glass fiber (core 12 and cladding layer 14), coating the glass fiber with the primary coating composition of the present invention, and polymerizing the composition to form the primary coating material 16. Optionally, a secondary coating composition can be applied to the coated fiber either before or after polymerizing the primary coating. When applied after polymerizing the primary coating, a second polymerization step must be employed.

The core and cladding layer are typically produced in a single operation by methods which are well known in the art. Suitable methods include: the double crucible method as described, for example, in Midwinter, Optical Fibers for Transmission, New York, John Wiley, pp. 166-178 (1979), which is hereby incorporated by reference in its entirety; rod-in-tube procedures; and doped deposited silica processes, also commonly referred to as chemical vapor deposition ("CVD") or vapor phase oxidation. A variety of CVD processes are known and are suitable for producing the core and cladding layer used in the optical fibers of the present invention. They include external CVD processes (Blankenship et al., "The Outside Vapor Deposition Method of Fabricating Optical Waveguide Fibers," IEEE J. Quantum Electron., 18:1418-1423 (1982), which is hereby incorporated by reference in its entirety), axial vapor deposition processes (Inada, "Recent Progress in Fiber Fabrication Techniques by Vapor-phase Axial Deposition," IEEE J. Quantum Electron. 18:1424-1431 (1982), which is hereby incorporated by reference in its entirety), and modified CVD or inside vapor deposition (Nagel et al., "An Overview of the Modified Chemical Vapor Deposition (MCVD) Process and Performance," IEEE J. Quantum Electron. 18:459-476 (1982), which is hereby incorporated by reference in its entirety).

It is well known to draw glass fibers from a specially prepared, cylindrical preform which has been locally and symmetrically heated to a temperature, e.g., of about 2000° C.

As the preform is heated, such as by feeding the preform into and through a furnace, a glass fiber is drawn from the molten material.

The primary and optional secondary coating compositions are coated on a glass fiber using conventional processes. The primary and optional secondary coating compositions are applied to the glass fiber after it has been drawn from the preform, preferably immediately after cooling. The coating compositions are then cured to produce the coated optical fiber. The method of curing can be thermal, chemical, or radiation induced, such as by exposing the un-cured coating composition on the glass fiber to ultraviolet light or electron beam, depending upon the nature of the coating composition (s) and polymerization initiator being employed. It is frequently advantageous to apply both the primary coating composition and any secondary coating compositions in sequence following the draw process. One method of applying dual layers of coating compositions to a moving glass fiber is disclosed in U.S. Pat. No. 4,474,830 to Taylor, which is hereby incorporated by reference in its entirety. Another method for applying dual layers of coating compositions onto a glass fiber is disclosed in U.S. Pat. No. 4,581,165 to Rannell et al., which is hereby incorporated by reference in its entirety. Of course, the primary coating composition can be applied and cured to form the primary coating material 16, then the secondary coating composition(s) can be applied and cured to form the secondary coating material 18.

Referring to FIG. 2, another aspect of the present invention relates to an optical fiber ribbon 20 that contains a plurality of the optical fibers 10 of the present invention. The optical fiber ribbon 20 can be prepared using conventional methods of preparation, and the individual optical fibers preferably include a suitable inking material applied over the secondary coating. For example, a plurality of coated and inked optical fibers 10 are substantially aligned in a substantially coplanar relationship to one another and, while remaining in this relationship, the coated optical fibers are coated with a composition that is later cured to form the ribbon matrix material 30. The matrix material 30 can be made of a single layer or of a composite construction. Suitable matrix materials include polyvinyl chloride as well as those materials known to be useful as secondary coating materials. Methods of preparing optical fiber ribbons are described in U.S. Pat. No. 4,752,112 to Mayr and U.S. Pat. No. 5,486,378 to Oestreich et al., each of which is hereby incorporated by reference in its entirety.

Having formed an optical fiber or ribbon in accordance with the present invention, these products are intended to be used in a telecommunication system for transmission of data signals over a network.

EXAMPLES

The invention will be further clarified by the following examples, which are intended to be exemplary of the invention.

Example 1

Preparation of Primary Coating Compositions

All materials were used as received. As used below, the sources of various components of the coating compositions are identified as follows:

Sartomer—Sartomer Company (West Chester, Pa.);
Bomar—Bomar Specialties Company (Winsted, Conn.);
Ciba—Ciba Specialty Chemicals (Hawthorne, N.Y.);
Cognis—Cognis Corporation (Ambler, Pa.);
Dow—Dow Chemical Co. (Midland, Mich.);
ISP—ISP Technologies (Waterford, Mich.);
Aldrich—Sigma-Aldrich (St. Louis, Mo.); and
Gelest—Gelest, Incorporated (Morrisville, Pa.)

Control Composition A
  BR3741 (Bomar), urethane acrylate oligomer, 52 wt %
  Photomer 4003 (Cognis), ethoxylated nonyl phenol acrylate monomer, 41.5 wt %
  Tone M-100 (Dow), caprolactone acrylate, 5 wt %
  Irgacure 819 (Ciba), photoinitiator, 1.5 wt %
  Irganox 1035 (Ciba), antioxidant, 1 pph
  Pentaerythritol tetrakis(3-mercaptopropionate) (Aldrich), 0.032 pph
  Acryloxypropyltrimethoxysilane (Gelest), 1 pph Test Composition 1
  BR3741 (Bomar), urethane acrylate oligomer, 52 wt %
  Photomer 4003 (Cognis), ethoxylated nonyl phenol acrylate monomer, 21.5 wt %
  ECX3040 (Cognis), nonylphenol glycidyl acrylate monomer, 20 wt %
  Tone M-100 (Dow), caprolactone acrylate, 5 wt %
  Irgacure 819 (Ciba), photoinitiator, 1.5 wt %
  Irganox 1035 (Ciba), antioxidant, 1 pph
  Pentaerythritol tetrakis(3-mercaptopropionate) (Aldrich), 0.032 pph
  Acryloxypropyltrimethoxysilane (Gelest), 1 pph Test Composition 2
  BR3741 (Bomar), urethane acrylate oligomer, 52 wt %
  ECX3040 (Cognis), nonylphenol glycidyl acrylate monomer, 41.5 wt %
  Tone M-100 (Dow), caprolactone acrylate, 5 wt %
  Irgacure 819 (Ciba), photoinitiator, 1.5 wt %
  Irganox 1035 (Ciba), antioxidant, 1 pph
  Pentaerythritol tetrakis(3-mercaptopropionate) (Aldrich), 0.032 pph
  Acryloxypropyltrimethoxysilane (Gelest), 1 pph Test Composition 3
  BR3741 (Bomar), urethane acrylate oligomer, 52 wt %
  Photomer 4003 (Cognis), ethoxylated nonyl phenol acrylate monomer, 20 wt %
  ECX3040 (Cognis), nonylphenol glycidyl acrylate monomer, 24.5 wt %
  V-CAPTM/RC (ISP), vinyl caprolactam, 2 wt %
  Irgacure 819 (Ciba), photoinitiator, 1.5 wt %
  Irganox 1035 (Ciba), antioxidant, 1 pph
  Pentaerythritol tetrakis(3-mercaptopropionate) (Aldrich), 0.032 pph
  Acryloxypropyltrimethoxysilane (Gelest), 1 pph Coating formulations were prepared in 5 gallon metal pails, which were coated with a chemical resistant epoxy resin by the manufacturer. Oligomer(s) was combined with the monomer and co-monomer, and the mixture was warmed with a heating band and stirred with an overhead stirrer. Aluminum foil was used to shield the coating from light. The mixture was stirred at 60° C. for 1-2 hours. Photoinitiator and antioxidant (in pph) solids were then added, and the mixtures were allowed to stir another 1-2 hours. After the homogeneous mixture cooled to room temperature, tetrathiol stabilizer (pentaerythritol tetrakis(3-mercaptopropionate)) was added (in pph) and the mixture was stirred for about 30 minutes. This was followed by the addition of silane adhesion promoter (in pph) and the mixture was stirred at room temperature for an additional 1-2 hours.

Compositions A, 1, 2, and 3 were tested for cure speed and liquid refractive index.

Cure speed is a measure of the percent of acrylate conversion per second (percent/s). The percentage of cure was evaluated in accordance with the Fourier Transform Infrared Spectroscopy analyses. Basically, an uncured film is applied to an ASI DuraSamplir® ATR crystal (or equivalent) at ~1 mm thickness, the film is purged with nitrogen for 30 sec, and then irradiated to induce polymerization with, e.g., Lesco Mark II Spot cure unit and UniBlitz® VS25 Shutter Assembly with model T132 driver. The shutter is opened for a 1 sec exposure, and spectra are collected at 6 ms intervals for 0.9 sec. Following the 0.1 sec pause, spectra are again collected for 5 sec following initial exposure. The shutter again opens for a 10 sec exposure, which allows for calculation of the 100% cure band ratio. Both uncured and fully cured band ratio are calculated for each, and a cure vs. time plot is constructed using conventional software, e.g., OPUS v3.04 in OS/2 (Spectrometer operation and data manipulation), Galactic Grans32 v5.02, and MicroCal Origin v6.0. The polymerization rate, Rp, can be calculated at any point in the curve from the slope of the curve, and the maximum polymerization rate is preferably estimated as the slope of the curve from 10% conversion to 40% conversion. The reported cure speed number is the slope of the line within this range.

The liquid coating refractive index is measured using, e.g., a Leica Abbe Mark II refractometer. A couple of drops of liquid coating is placed onto the prism and sandwiched into a thin liquid film. The temperature of the liquid in the refractometer is maintained at a temperature of about 25° C. using circulating water. The refractive index is measured at 589 nm. The temperature of the liquid coating is noted just prior to making the refractive index reading and both values reported.

The results of the cure speed and refractive index testing are presented in Table 1 below:

TABLE 1

Properties of Control Composition A and Inventive Compositions 1-2

| Primary Composition | Cure Speed Average (% conversion/s) ± SD | Refractive Index |
|---|---|---|
| A | 108 ± 3 | 1.4767 at 23.9° C. |
| 1 | 154 ± 2 | 1.4803 at 23.7° C. |
| 2 | 171 ± 2 | 1.4830 at 25.3° C. |
| 3 | 184 ± 4 | 1.4813 at 25.5° C. |

These results confirm that the coating of the present invention are characterized by a much higher cure speed, ranging from about 152 percent/s to about 188 percent/s. In comparison, the percentage of cure of the control was about 108 percent/s. The fast relative cure speed of the coating of the invention has been attributed to the combination of components in the coating of the invention, including the aliphatic-aromatic oxyglycidyl acrylate. In addition, the inclusion of a monomeric component of the present invention (e.g., nonylphenol glycidyl acrylate monomer) did not significantly reduce the refractive index; in fact, a slight increase in refractive index was demonstrated between Control Composition A and Inventive Composition 1.

Example 2

Testing of Cured Products of the Primary Coating Compositions

Samples of the coatings were applied to a glass surface and then cured by exposing the coatings to a dose level of about 1.0 J/cm² using a 600 watt/in D bulb (available from Fusion UV Systems, Inc. (Gaithersburg, Md.). The resulting coating materials were then tested for the following physical properties: Young's modulus and glass transition temperature ($T_g$).

The tensile (Young's) modulus value is a measure of the stiffness of a material and is calculated from the initial slope of a stress vs. strain curve. As used herein, the Young's modulus of a primary coating is measured using a tensile testing instrument (e.g., a Sintech MTS Tensile Tester, or an Instron Universal Material Test System) on a cured sample of material shaped as a film between about 0.003" (76 µm) and 0.004" (102 µm) in thickness and about 1.3 cm in width, with a gauge length of 5.1 cm, and a test speed of 2.5 cm/min. The slope of the resulting stress vs. stain curve is recorded as the Young's modulus.

The glass transition temperature ($T_g$) refers to the temperature below which a coating material is brittle and above which it is flexible. An alternative (and more accurate) definition is based on the fact that at the glass transition temperature, the coefficient of thermal expansion changes sharply. The glass transition temperature can be a single degree or a short range of degrees. The glass transition temperature ($T_g$) of polymeric materials may be measured by a variety of techniques such as differential scanning calorimetry (DSC) or dynamic mechanical analysis (DMA). The coatings evaluated herein were done so by the use of the DMA in tension. In DMA analysis (and in the data presented in this application) the value used for the $T_g$ is frequently defined as the maximum of the tan δ peak, where the tan δ peak is defined as:

$$\tan \delta = E''/E'$$

where E" is the loss modulus, which is proportional to the loss of energy as heat in a cycle of deformation and E' is the storage or elastic modulus, which is proportional to the energy stored in a cycle of deformation. See Ferry, J. D. *In Viscoelastic Properties of Polymers*, $3^{rd}$ ed., Wiley: New York, 1980, Chapter 1. The maximum value of the tan δ peak, while serving as a convenient measure of the $T_g$, typically exceeds the value that is obtained when the $T_g$ is measured by methods such as DSC.

The results of such testing are present in Table 2 below:

TABLE 2

Cured Film Properties of Control Coating A and Inventive Coatings 1-3

| Primary Coating | Young's Modulus (MPa), ± SD | Elongation to Break (%) ± SD | Tensile Strength (MPa) ± SD | $T_g$ (° C.) |
|---|---|---|---|---|
| A | 0.79 ± 0.08 | 100 ± 12 | 0.46 ± 0.05 | ND |
| 1 | 0.86 ± 0.04 | 151 ± 5 | 0.69 ± 0.04 | −23.6 |
| 2 | 0.91 ± 0.05 | 166 ± 16 | 0.79 ± 0.10 | −12.7 |
| 3 | 0.86 ± 0.03 | 160 ± 9 | 0.91 ± 0.12 | ND |

These results demonstrate that the inventive coatings have a sufficiently low Young's modulus, yet are stronger than the control as evidenced by the increased tensile strength and elongation to break. Importantly, the $T_g$ remains sufficiently low.

Example 3

Preparation of Optical Fibers with Primary Coatings

Optical fibers will be prepared using the above-identified primary coating materials and suitable secondary coating materials according to known procedures. A primary coating material will be applied to the fiber and cured, after which a secondary coating material will be applied and cured to drawn glass fibers subsequent to cooling. The glass fiber, having a diameter of about 125 μm, will be introduced into a container of one of the primary compositions listed in Example 1. As the coated fiber is removed from the container, the thickness of the primary coating composition will be adjusted to about 32.5 μm by passing the coated fiber through a die. The coated fiber will then be drawn through a second coating container holding a secondary coating composition. As the coated fiber is removed from the second container, the thickness of the secondary coating composition will be adjusted to about 27.5 μm by passing the coated fiber through a die.

The coated fiber will be cured with actinic radiation, preferably UV light at a dose level of less than about 1.0 J/cm² using a D (300 W) bulb (available from Fusion UV Systems, Inc. (Gaithersburg, Md.)), to produce an optical fiber having a diameter of about 245. A person of ordinary skill in the art may also refer to the D-bulb as an irradiator lamp.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A curable composition for coating an optical fiber comprising:
   an aliphatic-aromatic oxyglycidyl(meth)acrylate monomeric component, an aliphatic-(hetero)cyclic oxyglycidyl(meth)acrylate monomeric component, or a combination thereof; and
   an ethylenically unsaturated urethane or urea oligomeric component;
   wherein said monomeric component has the structure according to formula

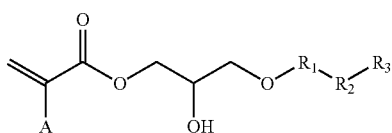

(I)

wherein A is H or CH₃;
   R₁ is optional, in which case R₂ is bonded directly to the oxyglycidyl structure, and RI can be an aliphatic hydrocarbon from about 1 to about 25 carbons in length, including straight and branched chain hydrocarbons, saturated or unsaturated, and those hydrocarbons containing one or more hetero atoms selected from the group of nitrogen, oxygen, halogens, silicon, sulfur, phosphorus, and mixtures thereof;
   R₂ is an aromatic moiety having a single ring, multiple ring, or fused ring structure, .and optionally containing one or more heteroatoms selected from the group of nitrogen, oxygen, sulfur, phosphorus, halogens and mixtures thereof, or a non-aromatic (hetero)cyclic moiety optionally containing one or more heteroatoms selected from the group of nitrogen, oxygen, sulfur, phosphorous, halogens, and mixtures thereof; and
   R₃ is an aliphatic hydrocarbon from about 1 to about 25 carbons in length, including straight and branched chain hydrocarbons, saturated or unsaturated, and those hydrocarbons containing one or more hetero atoms selected from the group of nitrogen, oxygen, halogens, silicon, sulfur, phosphorus, and mixtures thereof.

2. The curable composition of claim 1 further comprising a photoinitiator.

3. The curable composition of claim 1 wherein R1 is selected from the group of $C_{5-20}$ aliphatic hydrocarbons, which are represented by $(CH_2)_n(X—(CH_2)_n)_m$ where each n is independently from 2 to 5, m is from 1 to 10, and X is O or S.

4. The curable composition of claim 1 wherein R₂ is selected from the group of substituted and unsubstituted phenyls, indenes, pyrroles, imidazoles, benzimidazoles, oxazoles, quinolines, quinoxalines, quinazolines, cinnolines, pyrrazoles, purines, pyridines, pyrimidines, pyrrolidines, piperidines, thiophenes, furans, napthals, bi-phenyls, tri-phenyls, phenanthryl, anthracyl, cyclic alkenes and dienes, indoles, thiazoles, bisphenol A and derivatives thereof, and bisphenol F and derivatives thereof.

5. The curable composition of claim 1 wherein R₃ is selected from the group of $C_{5-15}$ aliphatic hydrocarbons.

6. The curable composition of claim 1 wherein said monomeric component is nonylphenolglycidyl (meth)acrylates according to formula (II)

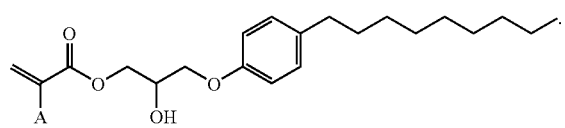

(II)

7. The curable composition of claim 1 further comprising a co-monomer.

8. The curable composition of claim 1 wherein said coating includes at least about 5 weight percent of said monomeric component.

9. The curable composition of claim 1 further comprising an adhesion promoter.

10. The curable composition of claim 1 wherein said oligomeric component is an aliphatic polyether urethane acrylate.

11. A coating product formed upon curing of the curable composition of claim 1 following exposure to actinic radiation.

12. The coating product of claim 11 wherein said actinic radiation is ultraviolet light.

13. The coating product of claim 11 wherein said coating product is characterized by one or more properties selected from the group of:
   a liquid coating refractive index of at least about 1.46;
   a glass transition temperature of not more than about 0° C.;
   a cure rate of at least about 120 percent's; and
   a Young's Modulus of not more than about 1.5 MPa.

14. The coating product of claim 11 wherein said coating product is characterized by one or more properties selected from the group of:
   a liquid coating refractive index of at least about 1.48;
   a glass transition temperature of not more than about −15° C.;
   a cure rate of at least about 140 percent's; and
   a Young's Modulus of not more than about 1.0 MPa.

15. The curable composition of claim 1, wherein the composition comprises a liquid coating refractive index of at least about 1.46 and a cure rate of at least about 120 percent/s.

16. The curable composition of claim 1, wherein the composition comprises a liquid coating refractive index of at least about 1.46.

17. The curable composition of claim 1, wherein the composition comprises a cure rate of at least about 120 percent/s.

18. An optical fiber comprising:
a glass fiber; and
a primary coating encapsulating and in contact with said glass fiber, said primary coating being the cured product of a polymerizable composition according to claim 1.

19. The optical fiber according to claim 18 further comprising at least one secondary coating.

20. An optical fiber ribbon comprising a plurality of optical fibers according to claim 18 and a matrix material encapsulating said plurality of optical fibers.

21. A telecommunication system comprising an optical fiber according to claim 18.

* * * * *